Sept. 15, 1925.

H. C. BOOKMAN

EGG CASE

Filed April 11, 1924

1,553,977

Inventor

H. C. Bookman

By

Lacy & Lacy, Attorneys

Patented Sept. 15, 1925.

1,553,977

UNITED STATES PATENT OFFICE.

HENRY C. BOOKMAN, OF SYRACUSE, NEW YORK.

EGG CASE.

Application filed April 11, 1924. Serial No. 705,863.

*To all whom it may concern:*

Be it known that I, HENRY C. BOOKMAN, a citizen of the United States, residing at Syracuse, in the county of Onondaga and State of New York, have invented certain new and useful Improvements in Egg Cases, of which the following is a specification.

This invention relates to an improved egg case and seeks, among other objects, to provide a device of this character adapted for use in the shipment or storage of eggs and wherein the possibility of breakage will be reduced to a minimum.

The invention seeks, as a further object, to provide an egg case embodying cushioning holders for the eggs and wherein the holders will be suspended in such manner as to yieldably support the eggs.

And the invention seeks, as a still further object, to provide an egg case wherein yieldable means will be provided for retaining the eggs in the egg holders.

Other and incidental objects will appear hereinafter.

Figure 1:
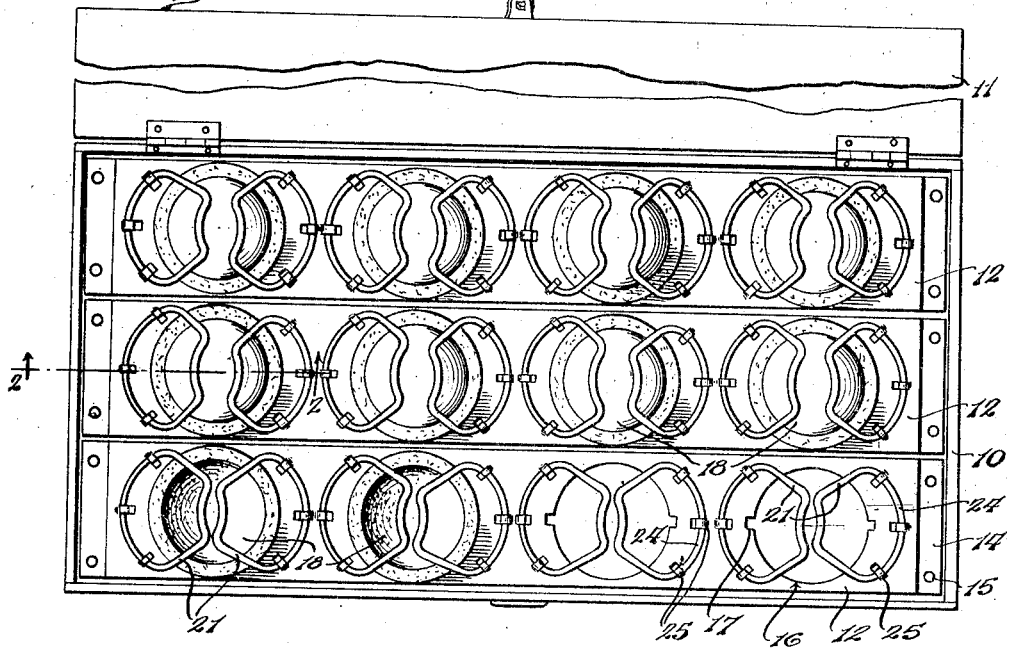
Figure 1 is a plan view showing an egg case constructed in accordance with the present invention.
Figure 2:
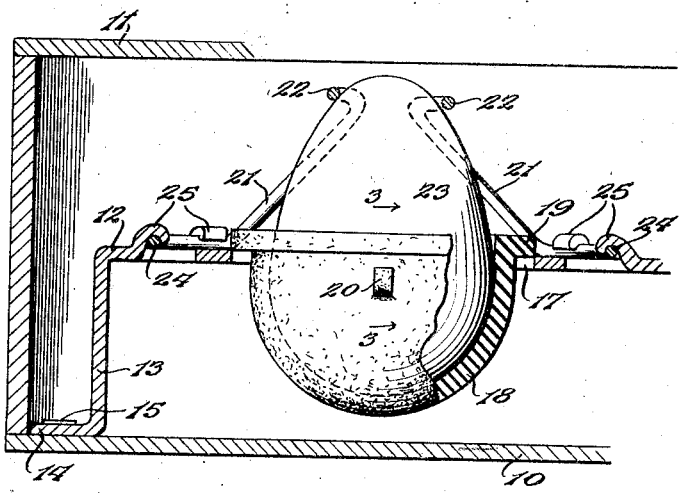
Figure 2 is an enlarged fragmentary sectional view on the line 2—2 of Figure 1, looking in the direction of the arrows.
Figure 3:
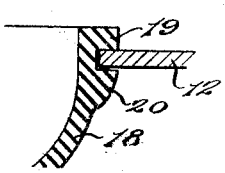
Figure 3 is a detail sectional view taken medially through one of the egg holders.

In carrying the invention into effect, I employ a casing 10 which may be of wood, sheet metal, or other approved material, and normally closing the casing is a hinged cover 11. Extending longitudinally within the casing are parallel racks 12 which may each be constructed from a strip of suitable resilient sheet metal bent near its ends to form legs 13 having base flanges 14 secured to the bottom wall of the casing by suitable fastening devices 15. The racks are provided at suitably spaced points with openings 16 at opposite sides of each of which is formed a pair of notches 17, and removably fitting through said openings to depend beneath the racks are cup-shaped egg holders 18, which are preferably formed of rubber. As brought out in Figure 2 of the drawings, the egg holders are substantially hemispherical and are provided with annular flanges 19 to overlie the racks supporting the holders thereon, and formed on each of said holders beneath the flange thereof, is one or more spaced stop lugs 20. The stop lugs 20 are adapted to pass through the notches 17 so that by positioning the holders so that the lugs register with said notches, the holders may be readily fitted upon the racks when, by rotating the holders slightly, the stop lugs will confront the lower faces of the racks for limiting the holders against upward displacement.

Associated with each of the egg holders 18 is a pair of egg retaining clamps 21 which are arranged to converge upwardly over the holder and are bent at their upper ends to define loops 22 to rest against opposite sides of an egg, as illustrated at 23, resting in the holder. The clamps are preferably each constructed from a length of suitable resilient wire and are formed with angularly disposed arcuate base portions 24 resting flat upon the racks. Struck from the racks to engage over said base portions of the clamps are tongues 25 rigidly securing the clamps in position, three of the tongues being preferably provided for each clamp. Thus, the clamps will serve to firmly retain the eggs in the egg holders and since these holders are of rubber said holders will function to cushion the eggs against shock and prevent the breaking thereof. At the same time, eggs may be readily placed within or removed from the holders by shifting the eggs sidewise between the clamps. I accordingly provide a particularly efficient device for the purpose set forth and while I have illustrated an egg case adapted to contain a dozen eggs, still, as will be understood, the invention may be constructed in any size desired to contain either a greater or less number of eggs.

Having thus described the invention, what I claim is:

1. An egg case including an egg holder, means mounting the holder, and a clamp for retaining an egg in the holder.

2. An egg case including a soft cushioning egg holder, means suspending the holder, and a clamp for retaining an egg in the holder.

3. An egg case including a rack, a pliable egg holder suspended by the rack, and a clamp mounted upon the rack for retaining an egg in said holder.

4. An egg case including a rack provided with an opening and formed at said opening with a notch, a cup-shaped egg holder fitting through said opening and provided with a flange to overlie the rack for suspending the holder upon the rack, a lug on the holder adapted to pass through said notch and disposed to confront the rack at its lower side limiting the holder against displacement from said opening, a pair of clamps mounted upon the rack to converge upwardly over the holder for retaining an egg in the holder, and tongues struck from the rack to engage over the clamps securing the clamps.

5. An egg case including a rack, an egg holder carried thereby, a spring clamp for retaining an egg in the holder, and means connecting the clamp with the rack.

6. An egg case including a rack, an egg holder carried thereby, a pair of clamps extending upwardly over the holder for retaining an egg therein, said clamps being looped to fit the egg and provided with lateral base portions resting upon the rack, and lugs struck from the rack to engage the base portions of the clamps securing said clamps in position.

In testimony whereof I affix my signature.

HENRY C. BOOKMAN. [L. S.]